FIG_2
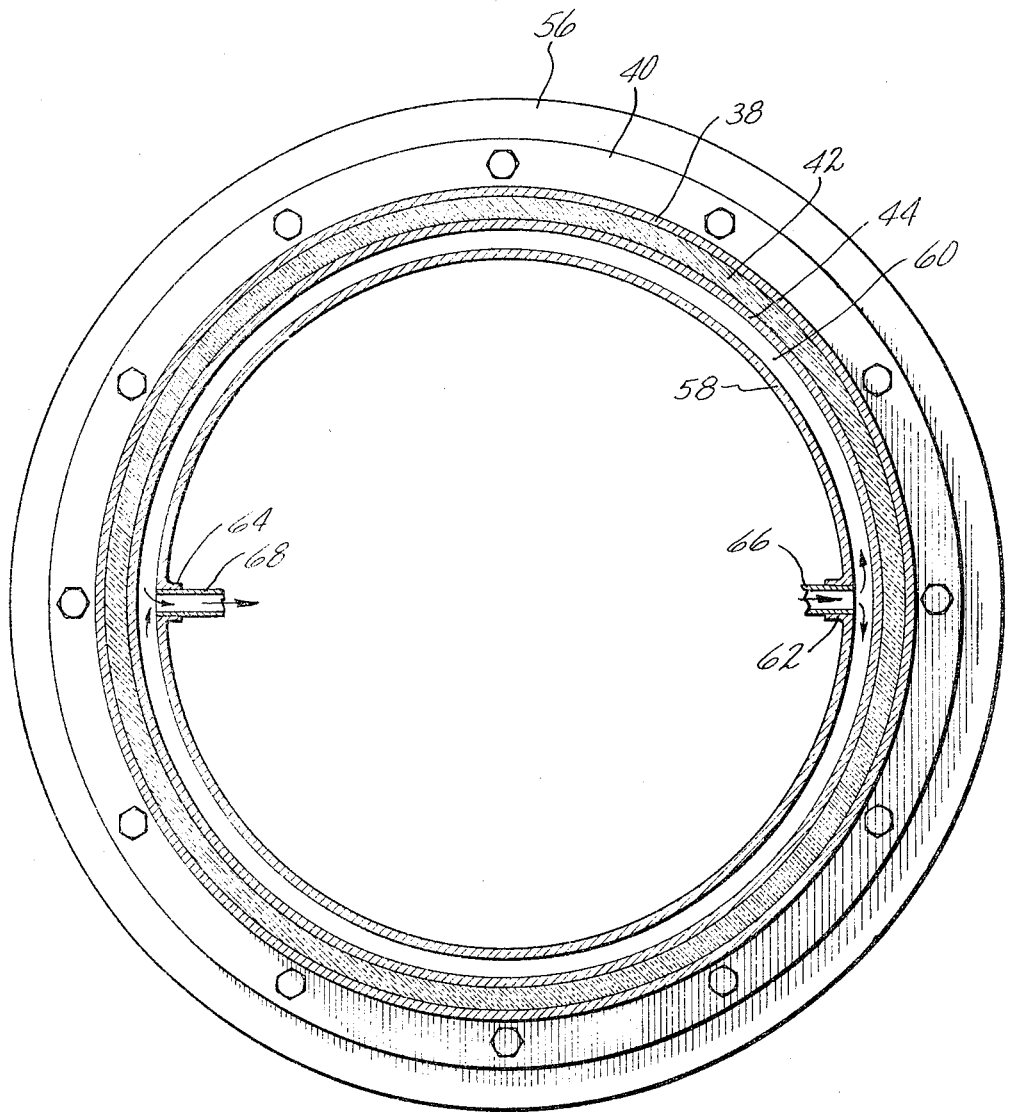

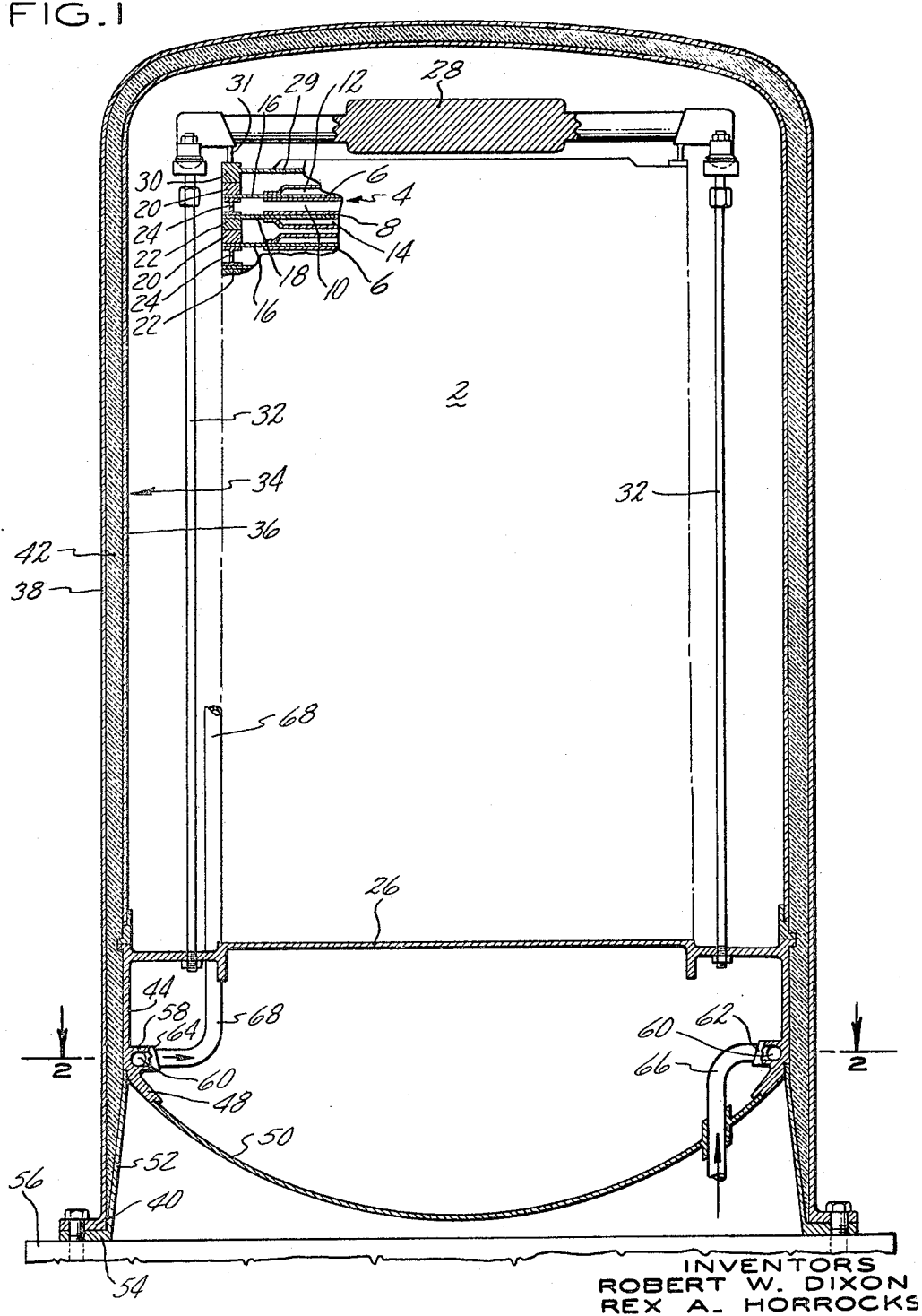

United States Patent Office 3,269,866
Patented August 30, 1966

3,269,866
LOW LOSS HEAT MOUNTING SYSTEM
Robert W. Dixon, Glastonbury, and Rex A. Horrocks, Marlborough, Conn., assignors to United Aircraft Corporation, East Hartford, Conn., a corporation of Delaware
Filed Feb. 28, 1962, Ser. No. 176,507
2 Claims. (Cl. 136—86)

This invention relates to a heat dam construction and more particularly to a low-loss heat mounting for a fuel cell system.

When a fuel cell system is operating at low power levels, the heat loss from the cell may be sufficiently to affect cell operation detrimentally particularly in the type of cell that operates at a high temperature. One feature of the invention is an arrangement for minimizing heat loss from the fuel cell container to the supporting structure.

More broadly stated, a feature of the invention is a heat dam in a container support to minimize heat transfer between the container and the support. Another feature is the use of a cooling fluid as a heat receiver for heat flowing between the container and the support in which the heat absorbed by the cooling fluid is utilized after the fluid has performed the cooling action.

Where the invention is used in conjunction with a fuel cell system, the cooling fluid used in the heat dam is subsequently used as one of the operating fluids in the fuel cell so that heat absorbed by the cooling fluid is delivered directly to the fuel cell for maintaining its temperature.

Other features and advantages will be apparent from the specification and claims, and from the accompanying drawings which illustrate an embodiment of the invention.

FIG. 1 is a vertical sectional view through a fuel cell system.

FIG. 2 is a transverse section along the line 2—2 of FIG. 1.

The invention is shown in connection with a fuel cell modulus 2 which includes a plurality of individual fuel cells 4 arranged in a stack. Each cell includes a pair of spaced electrodes 6 and 8 which are spaced apart to define a chamber 10 for an electrolyte. Each of the electrodes is hollow to provide in one electrode 6 a space 12 for fuel and in the other electrode 8 a space 14 for oxidant. The walls of the electrodes in contact with the electrolyte are porous to provide for contact between the electrolyte and the fuel and oxidant fluids within the porous walls.

The electrodes 6 and 8 have peripheral discs 16 and 18 attached thereto and on the periphery of the discs are rings 20 and 22. These rings 20 and 22 are positioned on the outer surfaces of the discs 16 and 18 with respect to each individual cell. Between the discs 16 and 18 is a seal 24 in line with the rings 20 and 22 to define a closure at the periphery of the electrode space 10.

As shown in FIG. 1, all of the rings 20 and 22 and the seals 24 are in stacked relation so that pressure applied in an axial direction on the assemblage of rings and seals will provide a leak-proof connection at the seal. It will be apparent that the ring 22 of one cell and the ring 20 of the next adjacent individual cell are of such a dimension that the electrode 8 of the first cell and the adjacent electrode 6 of the contiguous cell will be held in proper spaced relation to one another when the rings 20 and 22 are in contact, as shown.

The stack of fuel cells is located between a base plate 26 and a clamping plate 28 with the top clamping plate in engagement with a closure plate 29 having a peripheral ring 30. The ring 30 is engaged by a series of projections 31 on the clamping plate. A ring of tie bolts 32 surrounds the stack of fuel cells with the tie bolts extending between the bottom and clamping plates so that by tightening down these bolts the necessary clamping pressure may be applied to the rings 20 and 22 and the seal rings 24.

The entire assemblage, above described, is positioned within a double-walled container 34 having an inner wall 36 attached at its lower edge to the base plate 26 and an outer wall 38 surrounding the wall 36 in spaced relation thereto and projecting below the base plate 26 to terminate in an outwardly projecting flange 40. Insulation 42 positioned between the walls 36 and 38 minimizes heat transfer from or to the structure enclosed within the container. The base plate 26 has an integral depending peripheral sleeve 44 which is within and spaced from the outer wall 38 and forms, in effect, an extension of the inner wall 36. The sleeve 44 terminates in an inwardly extending flange 48 to which a closure cap 50 for the lower end of the device is secured.

Also attached to the lower portion of the sleeve 44 is a downwardly extending sleeve 52 forming a further extension of the inner wall 36 and its extension 44 terminating in an outwardly projecting flange 54 in contact with the flange 40. These two flanges together serve for attachment of the container to a supporting structure or to accessory devices represented by a housing 56.

Although the insulation minimizes heat transfer to or from flanges 40 or 54, the sleeve 44 has an inwardly projecting flange 58 extending peripherally around the sleeve and defining a passage 60 extending completely around the sleeve and having inlet and outlet connections 62 and 64, respectively. Fuel supplied to the fuel cell from a supply conduit 66 is delivered to the inlet tap 62 and from the outlet 64 is supplied to the fuel standpipe 68 from which the individual fuel electrodes are supplied by suitable connections, not shown.

When the fuel cells are operating at low power, the heat loss, as above stated, may be sufficient to cause a drop in power produced by the cell. With the arrangement shown, the fuel for the cell flowing through the cooling passage 60 will pick up heat being transferred along the sleeve 44 and will return this heat to the fuel cell in the form of an increase in temperature for the fuel. Although the description indiates that the fuel is used as a coolant, it may be desirable in some instances to use the oxidant supplied to the independent cell as the cooling fluid instead of the fuel.

It will also be understood that this same arrangement is equally applicable to the reduction of heat transfer from the flanges 40 and 54 into the structure enclosed within the container where this device might be utilized in an environment where the housing 56 would itself be at a higher temperature than the desired temperature within the container 34. Obivously the flow of the fluid into and out of passage 60 would be reversed in this event so that the excess heat absorbed by the cooling fluid would be taken away from the structure within the container.

It is to be understood that the invention is not limited to the specific embodiment herein illustrated and described, but may be used in other ways without departure from its spirit as defined by the following claims.

We claim:

1. The combination with a container having closely spaced inner and outer walls with insulation therebetween, a base plate attached to the inner wall and forming an end wall of the container, said inner and outer walls having extensions thereof adjacent one another and projecting beyond the base plate to form a mounting attachment and a flange on the end of the extensions remote from the base plate for attachment to a support, of a fuel cell module located within the container and to which operating fluids are supplied, a fluid passage in the extension of the inner wall, said passage being located between and in spaced relation to the base plate and to the flange, and means for directing one of the operating fluids for the module through said fuel passage and thence to the module thereby to limit the heat transfer along said inner wall extension between the base plate and the mounting flange.

2. The combination with a container having an insulated wall forming the top and sides of a container, a base plate attached to said wall to form an end wall of a container, said insulated wall extending beyond said base plate to form a mounting attachment for the container and a flange on the end of the extension remote from the base plate for attachment to a support, of a fuel cell module located within the container and to which operating fluids are supplied, a fluid passage in the extension located between the base plate and the flange and in spaced relation to both, and means for directing one of the operating fluids for the module through said fuel passage and then through the fuel cell module thereby to limit the heat transfer along said extension between the base plate and the flange.

References Cited by the Examiner
FOREIGN PATENTS 850,706  10/1960  Great Britain.

WINSTON A. DOUGLAS, *Primary Examiner.*

JOHN R. SPECK, *Examiner.*

H. FEELEY, *Assistant Examiner.*